United States Patent [19]

Ito et al.

[11] Patent Number: 4,777,396
[45] Date of Patent: Oct. 11, 1988

[54] ROTOR OF INDUCTION MOTOR

[75] Inventors: Motoya Ito, Katsuta; Keiji Arai, Kitaibaraki; Noriyoshi Takahashi, Hitachi; Noboru Fujimoto, Hitachi; Yoshitaka Kojima, Hitachi, all of Japan

[73] Assignee: Hitachi, Ltd., Tokyo, Japan

[21] Appl. No.: 111,804

[22] Filed: Oct. 23, 1987

[30] Foreign Application Priority Data

Oct. 25, 1986 [JP] Japan .................. 61-252823

[51] Int. Cl.4 ............................. H02K 21/12
[52] U.S. Cl. ........................ 310/156; 310/42; 310/44; 310/166; 310/261
[58] Field of Search .............. 310/261, 42, 262, 44, 310/264, 51, 265, 179, 156, 180, 181, 195, 198, 184, 166, 251, 208, 216, 254, 267; 29/598

[56] References Cited

U.S. PATENT DOCUMENTS

| | | | |
|---|---|---|---|
| 3,909,647 | 9/1975 | Peterson | 310/261 |
| 4,409,506 | 10/1983 | Ito et al. | 310/261 |
| 4,486,678 | 12/1984 | Olson | 310/261 |
| 4,678,954 | 7/1987 | Takeda | 310/156 |

Primary Examiner—R. Skudy
Attorney, Agent, or Firm—Antonelli, Terry & Wands

[57] ABSTRACT

A rotor of induction motor comprises a rotary shaft, a cylindrical rotor core fixedly secured on the rotary shaft, a conductive cover fixed on the outer circumferential surface of the rotor core, the conductive cover being formed of a composite material of magnetic material and electrically highly conductive material to have a circumferential permeability smaller than a radial permeability, and a magnetic skin made of a magnetic material and provided on the outer circumferential surface of the conductive cover, the magnetic skin having a circumferential permeability and an electrical conductivity which are set to be larger than the circumferential permeability and an electrical resistivity of the conductive cover, respectively, whereby a loss due to a spatial higher harmonics magnetic flux of higher order generated by a pulsating magnetic flux of slots in a stator of induction motor can be prevented.

32 Claims, 3 Drawing Sheets

ROTOR OF INDUCTION MOTOR

BACKGROUND OF THE INVENTION

This invention relates to a rotor of induction motor having no winding slots in its outer circumferential surface.

In recent years, as this type of rotor of induction motor, a rotor has been proposed in which on the outer circumferential surface of a rotor core, a conductive cover is provided which is made of a complex material of magnetic and electrically conductive materials, thereby ensuring that vibration and noise can be reduced and electrical characteristics such as torque characteristics can be improved (See U.S. Pat. No. 4,409,506, for example).

In the known rotor of induction motor, however, a loss due to spatial higher harmonics magnetic flux of higher order generated by a pulsating magnetic flux at stator slots was not taken into consideration. More particularly, the magnetic force is intensified at teeth but weakened at slots of the core of the stator and as a result eddy currents are generated in the circumferential surface of the rotor, giving rise to torque loss and heat loss.

SUMMARY OF THE INVENTION

An object of this invention is to provide a rotor of induction motor capable of reducing the loss due to spatial higher harmonics magnetic flux of higher order.

To accomplish the above object, according to the invention, a magnetic skin is provided on the outer circumferential surface of a conductive cover, and the circumferential permeability and electrical resistivity of the magnetic skin are made larger than those of the conductive cover.

With the rotor of induction motor constructed as above in accordance with the invention, the magnetic skin can pass the spatial higher harmonics magnetic flux of higher order to reduce the loss without impairing the effects of improving electrical characteristics thanks to the conductive cover.

DESCRIPTION OF THE PREFERRED EMBODIMENTS

The invention will now be described by way of example with reference to the accompanying drawings.

Figure 1:
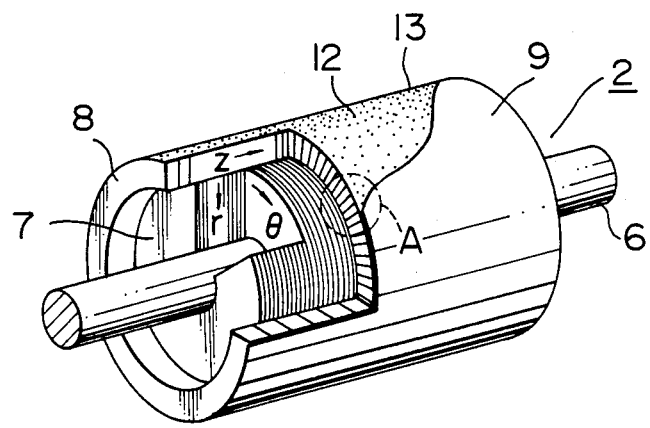
FIG. 1 is a perspective view, partly exploded, of a rotor of induction motor according to an embodiment of the invention.
Figure 2:
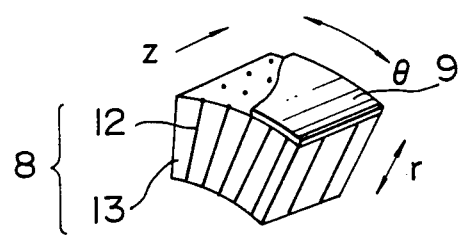
FIG. 2 is an enlarged perspective view illustrating a part A shown in FIG. 1.
Figure 3:
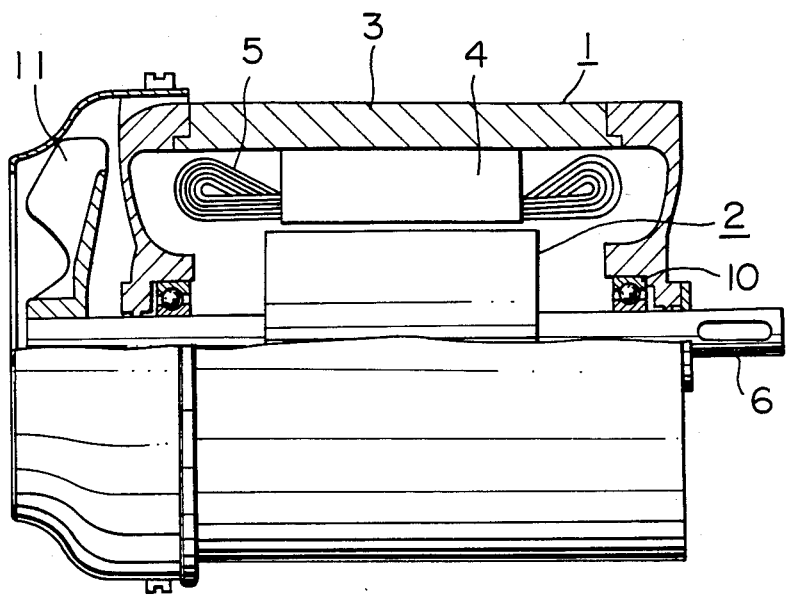
FIG. 3 is a side view showing an induction motor to which the rotor of the invention is applied, with the upper half of the induction motor sectioned longitudinally.

The overall construction of a rotor embodying the invention will first be described by referring to FIGS. 1, 2 and 3.

A stator 1 comprises a stator frame 3, a stator core 4 formed with a great number of slots, and a stator winding 5 fixedly received in the slots. A rotor 2 is of a cylindrical three-layer structure comprised of a cylindrical rotor core 7 surrounding a rotor shaft 6 and a cylindrical conductive cover 8 and a cylindrical magnetic skin 9 which sequentially overlie the rotor core 7. The rotor 2 is supported on the stator frame 3 through bearings 10. For cooling, a fan 11 is provided.

Members constituting the rotor 2 are constructed as will be described below by particularly making reference to FIG. 2. The rotor core 7 is made of laminated iron sheets. The conductive cover 8 has a great number of magnetic thin wires 12 made of a magnetic material such as iron which are disposed over the entire outer circumferential surface of the rotor core 7 so as to be directed in radial directions r and an electrically highly conductive and non-magnetic material 13 such as copper or aluminum which is filled in gaps among the magnetic thin wires 12 to provide an integral structure. For realization of the integral structure, casting or thermal shrinking may exemplarily be employed. The conductive cover 8 is snugly fitted on the rotor core 7 through, for example, shrinkage fit and the rotor core 7 is fixed to the rotor shaft 6. The magnetic skin 9 is formed by flame-coating magnetic powder of a high-permeability material, for example, Fe-Si-Al alloy (sendust) or Fe-Ni alloy (permalloy) on the outer circumferential surface of the conductive cover 8. The flame coating process includes gas flame coating, arc flame coating, plasma flame coating and explosion flame coating.

The respective members constructed as above have electromagnetic properties as will be described below. Since the rotor core 7 is made of the iron sheets laminated in axial direction z, the magnetic flux is easy to pass in circumferential and radial directions $\theta$ and r but difficult to pass in the axial direction z. Since the conductive cover 8 has magnetic thin wires 12 directed in the radial directions r, permeability $\mu_r$ in the radial direction r is related in magnitude to permeability $\mu_\theta$ in the circumferential direction $\theta$ by $\mu_r > \mu_\theta$. Because of the electrically highly conductive filler 13, the conductive cover 8 has electrical resistivity $\rho$ which is small in the circumferential and axial directions $\theta$ and z and besides closed current circuits are set up everywhere in the electrically highly conductive material 13. The magnetic skin 9 is made from, for example, sendust and hence has a permeability $\mu'_r$ in the radial direction r and a permeability $\mu'_\theta$ in the circumferential direction $\theta$ which are larger than those of the conductive cover 8 as well as a relatively large electrical resistivity $\rho'$. Further, the magnetic skin 9 formed through flame coating process has a very small thickness t.

Figure 4:
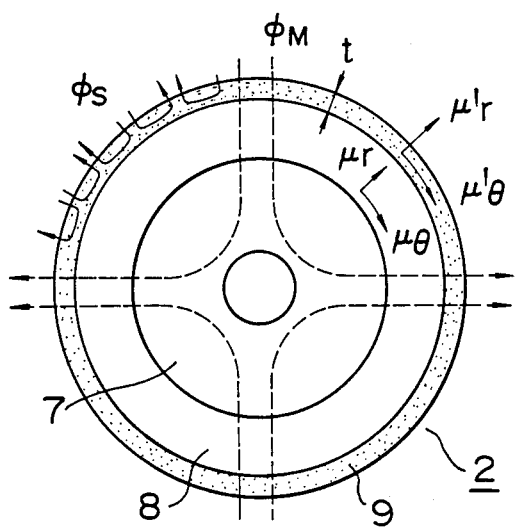
FIG. 4 is a diagram showing a model illustrative of flows of magnetic flux within the rotor in accordance with the invention.

With the electromagnetic properties of the respective members described above in mind, electrical performance of the rotor will be explained by referring to FIG. 4 in which a model of the rotor is illustrated in crosssectional form to show flows of magnetic flux. As an example, a four-pole induction motor is taken herein.

A main magnetic flux $\phi_M$ starting from one of paired magnetic poles (not shown) penetrates through the magnetic skin 9 and conductive cover 8 to reach the stator core 7 and returns to a position on the outer circumference at which the other of paired magnetic poles is located. The conductive cover 8 is a torque generating portion and as well known in the art, excellent torque characteristics can be obtained by making the conductive cover 8 have a relative permeability of 100 or more in the radial direction r and a relative permeability of 10 or less in the circumferential direction $\theta$. The rotor core 7 is used as a circumferential ($\theta$) path for the main flux $\phi_M$.

Now considering a pulsating magnetic flux $\phi_S$ at the slots in the stator, this flux $\phi_S$ is due to the slots which are formed in the stator core 4 to receive the stator winding 5. More specifically, reluctance between each slot in the core 4 of the stator 1 and the rotor 2 differs from reluctance between each tooth of the stator and the rotor, resulting in the occurrence of the pulsating magnetic flux $\phi_S$ which is a spatial higher harmonics magnetic flux fluctuating at a period corresponding to a pitch between adjacent slots in the stator. As shown in FIG. 4, the pulsating flux $\phi_S$ at the slots in the stator comes into the rotating rotor 2 at intervals of a short pitch and takes the form of a high frequency pulsating flux which flows through the magnetic skin 9 acting as a path therefor. Since the magnetic skin 9 has the large permeability $\mu'_\theta$ in the circumferential direction $\theta$ and the high electrical resistivity, the loss due to the pulsating flux $\phi_S$ generated at the slots in the stator can be minimized and a high-performance induction motor having a small loss can therefore be materialized.

Electromagnetic properties of the magnetic skin 9 will now be described in greater detail with reference to FIG. 4. It is necessary that the magnetic skin 9 be designed in consideration of properties of the conductive cover 8 because the function of the conductive cover 8 which generates torque should not be impaired seriously by a fundamental magnetic flux. Accordingly, in the first place, the thickness t of the magnetic skin 9 is desired to be very smaller than that of the conductive cover 8. The permeability $\mu'_r$ is the radial direction r is preferably selected to be substantially equal to the permeability $\mu_r$ of the conductive cover 8 in order to facilitate the main magnetic flux $\phi_M$ to pass but the former permeability may be made smaller than the latter without causing critical problems when the thickness t of the magnetic skin 9 is very small. Importantly, the permeability $\mu'_\rho$ in the circumferential direction $\theta$ of the magnetic skin 9 is however critical.

While a small circumferential permeability $\mu_\theta$ of the conductive cover 8 is necessary condition for generating a large level of torque, the circumferential permeability $\mu'_\theta$ of the magnetic skin 9 must be set to be larger than the circumferential permeability $\mu_\theta$ of the conductive cover 8 in order that the magnetic skin 9 can efficiently act as a circumferential magnetic path for the pulsating flux $\phi_s$ at the slots in the stator. In addition, while the electrical resistivity $\rho$ of the conductive cover 8 is made small to generate large torque, the electrical resistivity $\rho'$ of the magnetic skin 9 must be set to be larger than the electrical resistivity $\rho$ of the conductive cover 8 in order to suppress eddy currents generated by the pulsating flux $\phi_s$ at the slots in the stator.

During the rated operation, the fundamental flux is of a very low frequency which corresponds to a slip frequency of the motor but contrarily the pulsating flux $\phi_S$ at the slots in the stator pulsates at a high frequency which is usually determined by the number of slots in the stator and the rotation speed. The pulsating flux $\phi_S$ at the slots penetrates into the outer circumferential surface of the rotor by a penetrating depth $\delta$ which is indicated by the following equation:

$$\delta = \sqrt{2\rho'/(\mu'_\theta \omega)} \qquad (1)$$

where $\omega$ represents an angular frequency of the pulsating flux $\phi_S$ at the slots. Accordingly, the thickness t of the magnetic skin 9 is preferably selected to be substantially equal to or slightly larger than the depth $\delta$.

To further describe the circumferential permeability $\mu'_\theta$ of the magnetic skin 9, when the $\mu'_\theta$ is increased, the $\delta$ indicated by equation (1) decreases, so that an equivalent reluctance of the magnetic skin 9 against the pulsating flux $\phi_S$ at the stator slots can be increased to decrease the generated loss. Under this condition, an equivalent circumferential reluctance of the magnetic skin 9 against the fundamental flux $\phi_M$ is contrarily decreased, with the result that a leakage component passing through the magnetic skin 9 is increased to decrease a component penetrating into the conductive cover 8. This decreases the generated torque. Conversely, when the $\mu'_\theta$ is decreased, the fundamental flux can sufficiently penetrate into the conductive cover 8 to generate large torque but the equivalent reluctance against the pulsating flux $\phi_S$ at the stator slots, on the other hand, is decreased to increase the loss.

Figure 5:
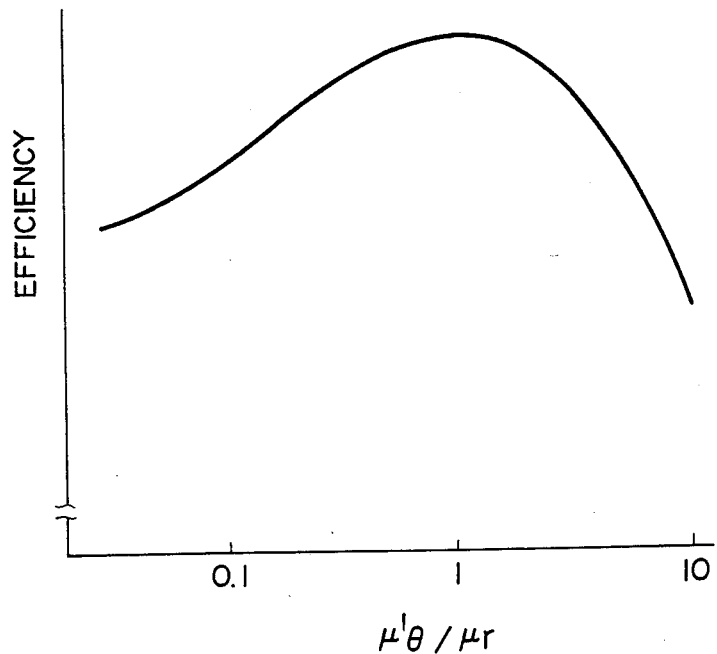
FIG. 5 is a graph showing the relation between efficiency of the induction motor and permeability.

Exemplarily, the above phenomenon was examined in an induction motor of one horsepower to obtain results as graphically illustrated in FIG. 5. This figure clearly indicates that the maximum efficiency can be obtained near a point at which the circumferential permeability $\mu'_\theta$ of the magnetic skin 9 almost equals the radial permeability $\mu_r$ of the conductive cover 8 and that the efficiency is degraded as the circumferential permeability $\mu'_\theta$ of the magnetic skin 9 changes to exceed or not to exceed that point. Preferably, the circumferential permeability $\mu'_\theta$ of the magnetic skin 9 is therefore selected to be substantially equal to the radial permeability $\mu_r$ of the conductive cover 8. In the present embodiment, the proper value of the circumferential permeability $\mu'_\theta$ of the magnetic skin 9 can be determined by choosing the kind of iron powder used for flame coating. For example, $Fe_2O_3$ type magnetic material (ferrite) may be used satisfactorily.

Figure 6:
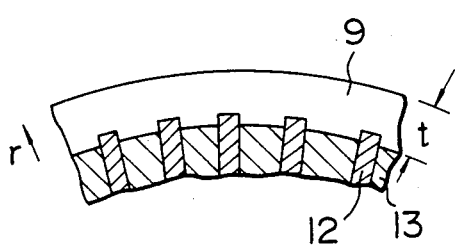
FIG. 6 is a fragmentary enlarged sectional view showing a rotor according to another embodiment of the invention.

In flame-coating magnetic powder, the following points should be taken into consideration. Preferably, in advance of carrying out the flame coating to form the magnetic skin 9, the outer circumferential surface of the conductive cover 8 is finely roughened through, for example, mechanical process. Knurling of the conductive cover 8, for example, is effective to roughen its outer surface. If the magnetic thin wires 12 are preprocessed to slightly project from the electrically highly conductive filler 13 to thereby contour the outer circumferential surface of the conductive cover 8 as illustrated in FIG. 6, the flame coating can be facilitated without resort to the roughening process.

While in the foregoing embodiment the magnetic skin 9 has been described as being formed by flame coating, the present invention is not limited thereto and the magnetic skin 9 may precedently be formed as a cylindrical member and this cylindrical magnetic skin member may then be fitted on the cylindrical conductive cover 8.

In forming the magnetic skin 9 by flame coating, the flame coating process may proceed to temporarily provide a thickness which is larger than a desired (eventual) thickness and thereafter the temporarily formed thickness may be cut out until the desired value. In this manner, the gap between rotor and stator can be so controlled as to be minimized with high accuracy.

In addition to the flame coating of magnetic powder, vapor deposition of magnetic powder or coating of resin mixed with magnetic powder may be employed for the formation of a magnetic skin which is comparable to the magnetic skin of the previous embodiment.

Other advantages brought about by the provision of the magnetic skin 9 will be described herein. Where the conductive cover 8 is formed of a great number of magnetic thin wires 12 and the electrically highly conductive material 13 filled in gaps among the thin wires 12, the diameter of each magnetic thin wire 12 and the number of th magnetic thin wires involved have relation to the spatial higher harmonics magnetic flux. Specifically, it is desirable that the diameter of each magnetic thin wire 12 be made as small as possible and the number of the thin wires be increased. Actually, however, individual magnetic thin wires have an appreciable diameter and hence the spatial magnetic flux contains a higher harmonics component due to a distribution of the magnetic thin wires. Under the circumstances, the magnetic skin can advantageously afford to uniform magnetic properties of the rotor outer circumferential surface as viewed from the stator/rotor gap and consequently suppress the higher harmonics component of spatial flux due to the distribution of the magnetic thin wires constituting the conductive cover. Since, as well known in the art, the spatial higher harmonics magnetic flux causes noise and vibration, the provision of the magnetic skin is successful in suppressing the occurrence of noise and vibration and providing a high-performance induction motor.

Further, the conductive cover 8 is made of a composite material of magnetic thin wires 12 and electrically highly conductive filler 13 and its circumferential surface is difficult to machine uniformly, leaving behind slight unevenness in the surface and slight eccentricity which are prone to possible occurrence of noise and vibration in the motor. Under the circumstances, the conductive cover 8 can be surrounded by the magnetic skin 9, formed by flame-coating magnetic powder in accordance with the previous embodiment, which is easy to work so as to provide a uniform outer circumferential surface, thus materializing an induction motor of high dimensional accuracy and less noise and vibration.

As described above, according to the invention, the magnetic skin is provided on the outer circumferential surface of the conductive cover, and the circumferential permeability and electrical resistivity of the magnetic skin are made larger than those of the conductive cover and at the same time the radial thickness of the magnetic skin is made smaller than that of the conductive cover, whereby the spatial higher harmonics magnetic flux of higher order attributable to the pulsating magnetic flux at slots in the stator can be permitted to pass through the magnetic skin to thereby reduce a loss due to passage of the spatial higher harmonics magnetic flux through the conductive cover without impairing the effects of improving electrical characteristics attained by the conductive cover.

We claim:

1. A rotor of induction motor comprising:
   a rotary shaft;
   a cylindrical rotor core fixedly secured on said rotary shaft;
   a conductive cover fixed on the outer circumferential surface of said rotor core, said conductive cover being formed of a composite material of magnetic material and electrically highly conductive material to have a circumferential permeability smaller than a radial permeability; and
   a magnetic skin made of a magnetic material and provided on the outer circumferential surface of said conductive cover, said magnetic skin having a circumferential permeability and an electrical resistivity which are set to be larger than the circumferential permeability and an electrical resistivity of said conductive cover, respectively.

2. An induction motor rotor according to claim 1 wherein said magnetic skin is formed by flame-coating magnetic powder on the outer circumferential surface of said conductive cover.

3. An induction motor rotor according to claim 1 wherein said magnetic skin is made from Fe-Si-Al alloy.

4. An induction motor rotor according to claim 1 wherein said magnetic skin is made from Fe-Ni alloy.

5. An induction motor rotor according to claim 1 wherein the circumferential permeability of said magnetic skin is substantially equal to the radial permeability of said conductive cover.

6. An induction motor rotor according to claim 1 wherein the outer circumferential surface of said conductive cover is roughened.

7. An induction motor rotor according to claim 1 wherein the outer circumferential surface of said conductive cover is knurled.

8. A rotor of induction motor comprising:
   a rotary shaft;
   a cylindrical rotor core fixedly secured on said rotary shaft;
   a conductive cover fixed on the outer circumferential surface of said rotor core, said conductive cover being formed of a composite material of magnetic material and electrically highly conductive material to have a circumferential permeability smaller than a radial permeability; and
   a magnetic skin made of a magnetic material and provided on the outer circumferential surface of said conductive cover, said magnetic skin having a circumferential permeability and an electrical resistivity which are set to be larger than the circumferential permeability and an electrical resistivity of said conductive cover, respectively, and having a radial thickness which is set to be substantially equal to a penetrating depth of a pulsating magnetic flux generated at slots in a stator of induction motor.

9. An induction motor rotor according to claim 8 wherein said magnetic skin is formed by flame-coating magnetic powder on the outer circumferential surface of said conductive cover.

10. An induction motor rotor according to claim 8 wherein said magnetic skin is made from Fe-Si-Al alloy.

11. An induction motor rotor according to claim 8 wherein said magnetic skin is made from Fe-Ni alloy.

12. An induction motor rotor according to claim 8 wherein the circumferential permeability of said magnetic skin is substantially equal to the radial permeability of said conductive cover.

13. An induction motor rotor according to claim 8 wherein the outer circumferential surface of said conductive cover is roughened.

14. An induction motor rotor according to claim 8 wherein the outer circumferential surface of said conductive cover is knurled.

15. A rotor of induction motor comprising:
a rotary shaft;
a cylindrical rotor core fixedly secured on said rotary shaft;
a conductive cover fixed on the outer circumferential surface of said rotor core, said conductive cover being formed of a composite material of magnetic material and electrically highly conductive material to have a circumferential permeability smaller than a radial permeability; and
a magnetic skin made of a magnetic material and provided on the outer circumferential surface of said conductive cover, said magnetic skin having a circumferential permeability and an electrical resistivity which are set to be larger than the circumferential permeability and an electrical resrstivity of said conductive cover, respectively, and having a radial thickness which is set to be slightly larger than a penetrating depth of a pulsating magnetic flux generated at slots in a stator of induction motor.

16. An induction motor rotor according to claim 15 wherein said magnetic skin is formed by flame-coating magnetic powder on the outer circumferential surface of said conductive cover.

17. An induction motor rotor according to claim 15 wherein said magnetic skin is made from Fe-Si-Al alloy.

18. An induction motor rotor according to claim 15 wherein said magnetic skin is made from Fe-Ni alloy.

19. An induction motor rotor according to claim 15 wherein the circumferential permeability of said magnetic skin is substantially equal to the radial permeability of said conductive cover.

20. An induction motor rotor according to claim 15 wherein the outer circumferential surface of said conductive cover is roughened.

21. An induction motor rotor according to claim 15 wherein the outer circumferential surface of said conductive cover is knurled.

22. A rotor of induction motor comprising:
a rotary shaft;
a cylindrical rotor core fixedly secured on said rotary shaft;
a conductive cover fixed on the outer circumferential surface of said rotor core, said conductive cover being formed of a composite material of magnetic material and electrically highly conductive material to have a circumferential permeability smaller than a radial permeability; and
a cylindrical magnetic skin member made of a magnetic material and covering the outer circumferential surface of said conductive cover, said magnetic skin member having a circumferential permeability and an electrical resistivity which are set to be larger than the circumferential permeability and an electrical resistivity of said conductive cover, respectively.

23. An induction motor rotor according to claim 22 wherein said magnetic skin member is made from Fe-Si-Al alloy.

24. An induction motor rotor according to claim 22 wherein said magnetic skin member is made from Fe-Ni alloy.

25. An induction motor rotor according to claim 22 wherein the circumferential permeability of said magnetic skin member is substantially equal to the radial permeability of said conductive cover.

26. A rotor of induction motor comprising:
a rotary shaft;
a cylindrical rotor core fixedly secured on said rotary shaft;
a conductive cover fixed on the outer circumferential surface of said rotor core, said conductive cover being comprised of a plurality of radially extending magnetic thin wires and an electrically highly conductive material filled in gaps among said magnetic thin wires; and
a magnetic skin made of a magnetic material and formed on the outer circumferential surface of said conductive cover to have a thickness which is originally larger than a desired thickness and thereafter cut out to the desired thickness, said magnetic skin having a circumferential permeability and an electrical resistivity which are set to be larger than a circumferential permeability and an electrical resistivity of said conductive cover, respectively.

27. An induction motor rotor according to claim 26 wherein said magnetic skin is formed b flame-coating magnetic powder on the outer circumferential surface of said conductive cover.

28. An induction motor rotor according to claim 26 wherein said magnetic skin is made from Fe-Si-Al alloy.

29. An induction motor rotor according to claim 26 wherein said magnetic skin is made from Fe-Ni alloy.

30. An induction motor rotor according to claim 26 wherein the circumferential permeability of said magnetic skin is substantially equal to the radial permeability of said conductive cover.

31. An induction motor rotor according to claim 26 wherein the outer circumferential surface of said conductive cover is roughened.

32. An induction motor rotor according to claim 26 wherein the outer circumferential surface of said conductive cover is knurled.

* * * * *